US006270535B1

United States Patent
Singh

(10) Patent No.: US 6,270,535 B1
(45) Date of Patent: Aug. 7, 2001

(54) METHOD OF FORMING COOOH AND NIOOH IN A NIMH ELECTROCHEMICAL CELL AND AN ELECTROCHEMICAL CELL FORMED THEREBY

(75) Inventor: Deepika B. Singh, Gainesville, FL (US)

(73) Assignee: Moltech Power Systems, Inc., Alachua, FL (US)

( * ) Notice: Subject to any disclaimer, the term of this patent is extended or adjusted under 35 U.S.C. 154(b) by 0 days.

(21) Appl. No.: 09/148,176

(22) Filed: Sep. 4, 1998

(51) Int. Cl.$^7$ ...................................................... H01M 4/52
(52) U.S. Cl. ..................... 29/623.1; 429/223; 429/218.1; 205/60
(58) Field of Search ..................................... 320/125, 162, 320/161, 164; 429/223, 218.2; 29/623.1, 623.2, 623.4, 623.5; 205/60

(56) References Cited

U.S. PATENT DOCUMENTS

| | | | |
|---|---|---|---|
| 5,439,756 | * | 8/1995 | Anani et al. ............................... 429/9 |
| 5,489,314 | * | 2/1996 | Bogauchi et al. .................... 29/623.1 |
| 5,506,076 | * | 4/1996 | Miyamoto et al. .................... 429/223 |
| 5,569,554 | * | 10/1996 | Tsenter .................................... 429/57 |
| 5,688,616 | | 11/1997 | Yamawaki et al. . |
| 5,698,342 | | 12/1997 | Klein . |
| 5,708,349 | | 1/1998 | Hasebe et al. . |
| 5,764,030 | * | 6/1998 | Gaza ..................................... 320/116 |
| 5,844,398 | * | 12/1998 | Kwan et al. ............................ 320/31 |
| 5,905,362 | * | 5/1999 | Nagano et al. ....................... 320/125 |

FOREIGN PATENT DOCUMENTS

| | | |
|---|---|---|
| 0 744 781 | 11/1996 | (EP) . |
| 0817292A2 | 1/1998 | (EP) ............................... H01M/4/52 |
| 7-211353 | 12/1995 | (JP) . |
| 09245780 | 9/1997 | (JP) ............................... H01M/4/32 |
| 09245827 | 9/1997 | (JP) ............................. H01M/10/30 |

OTHER PUBLICATIONS

Patent Abstracts of Japan, vol. 1995, No. 11, corresponding to JP 07–211353 (Dec. 26, 1995).
Chemical Abstracts, vol. 123 Columbus, Ohio, U.S.A.; Abstract No. 291832, "Manufacture of secondary alkaline batteries with cobalt containing paste type nickel cathodes," corresponding to JP 07–211353 A2 (1995).
Patent Abstracts of Japan, vol. 018, No. 63, corresponding to JP 05–283071 (Feb. 2, 1994).
Patent Abstracts of Japan, vol. 017, No. 289, corresponding to JP 05–021092 (Jun. 3, 1993).
Patent Abstracts of Japan, vol. 017, No. 319, corresponding to JP 05–036437 (Jun. 17, 1993).

* cited by examiner

Primary Examiner—Carol Chaney
(74) Attorney, Agent, or Firm—Jacqueline M. Nicol

(57) ABSTRACT

A formation procedure for a NiMH electrochemical cell is disclosed that significantly shortens the time required to fully form such a cell. The formation procedure includes a first step during which the cell is charged at a constant voltage of preferably 1.0 volt for approximately three hours. A second charging step is performed by applying either a constant charge current at a predetermined rate of C/3 for five hours or applying a constant voltage of 1.45 to 1.5 volts for five to nine hours. A third step may optionally be used whereby the cell is charged at a constant current of C/10 for about two hours. NiMH cells subjected to this formation procedure have a much greater percentage of the starting cobalt material in the positive electrode converted to CoOOH thereby improving the conductive matrix formed about the $Ni(OH)_2$/NiOOH particles, which constitute the active material of the positive electrode. The disclosed inventive formation procedures result in higher utilization, higher cell capacities following long-term storage, or storage at high temperatures as well as improved capacity recovery following deep discharge.

27 Claims, 7 Drawing Sheets

US 6,270,535 B1

METHOD OF FORMING COOOH AND NIOOH IN A NIMH ELECTROCHEMICAL CELL AND AN ELECTROCHEMICAL CELL FORMED THEREBY

BACKGROUND OF THE INVENTION

The present invention generally relates to the formation of a nickel metal hydride (NiMH) electrochemical cell. More particularly, the present invention relates to the formation of a cobalt (III) conductive matrix on and around particles of electrochemically active nickel compound in a positive electrode of a NiMH electrochemical cell.

NiMH cells, particularly those NiMH cells having foam positive electrodes, are well known for their high capacities and energy densities. In typical NiMH cells, the negative electrode is formed of a metal hydride while the positive electrode is formed of nickel hydroxide $Ni(OH)_2$. The NiMH cells are assembled in a discharged state. During charging, the $Ni(OH)_2$ converts to nickel oxyhydroxide (NiOOH), which converts back to $Ni(OH)_2$ upon discharge. Because $Ni(OH)_2$ is not electrically conductive, an electrically conductive matrix must be formed around the $Ni(OH)_2$ particles. A common conductive matrix used in such positive electrodes is made of cobalt oxyhydroxide (CoOOH). To form a conductive matrix of CoOOH around $Ni(OH)_2$ particles, spherical $Ni(OH)_2$ particles and oxides of cobalt are physically mixed to form a paste. One cobalt oxide compound that may be included in the paste is CoO. The cobalt oxide compound dissolves in an alkaline electrolyte to form $HCoO_2^-$ ions, which surround the spherical $Ni(OH)_2$ particles and re-precipitate as cobalt hydroxide $(Co(OH)_2)$. The conductive network of CoOOH is formed when the electrode is charged in accordance with a formation procedure. Relatively low charging rates are used for long periods of time to form the conductive network and to activate the $Ni(OH)_2$ to NiOOH. This can be time consuming and labor intensive since this formation procedure involves charging an assembled cell with a constant current of C/20 for thirty-two hours.

One function of the formation procedure is to convert all the $Co(OH)_2$, which includes cobalt in its +2 valance state (i.e., Co(II)), to CoOOH, which includes cobalt in its +3 valance state (i.e., Co(III)). If the cobalt is not converted completely to CoOOH, other species of cobalt are formed such as $Co_3O_4$, which is electrochemically inactive.

Also, the cobalt that is left behind in the +2 valance state dissolves in the alkaline electrolyte as $HCoO_2^-$ ions. The $HCoO_2^-$ ions are very mobile, and move to and through the separator and plate the separator or the metal hydride negative electrode. The unconverted $HCoO_2^-$ ions readily get converted to $Co_3O_4$ in the presence of oxygen, which is obtained when the positive electrode self-discharges to form $Ni(OH)_2$. The migration and conversion of the $HCoO_2^-$ ions cause soft shorts and a redistribution of cobalt in the negative electrode. Because $Co_3O_4$ is electrochemically inert and acts as an insulator within the electrode, the formation of $Co_3O_4$ reduces the charge and discharge efficiency of the positive electrode. Longer soak times (i.e., the time during which the electrode is soaked in electrolyte so as to dissolve the CoO in high temperatures) accelerate this process.

Since part of the Co(II) is converted to $Co_3O_4$, less Co(II) is available to form the Co(III) conductive matrix during the formation procedure. Due to the detrimental effects of having $Co_3O_4$ form in the positive electrode, a method is needed for forming a NiMH cell that maximizes the percentage of Co(II) converted and maintained as Co(III).

Another function of the formation procedure is to activate as much of the $Ni(OH)_2$ as possible in the positive electrode. In many cases the $Ni(OH)_2$ at the outer surface of the electrode is charged to form NiOOH. This is followed by oxygen evolution. Once the oxygen evolution begins, the electrode no longer accepts charge to form the remaining $Ni(OH)_2$, which may be buried deep in the electrode. Activating as much of the $Ni(OH)_2$ as possible not only influences the first cycle capacity, but also affects the performance of the cells during consecutive cycles. Therefore, there further exists the need for a formation procedure that maximizes the amount of $Ni(OH)_2$ that is activated.

Another practical problem relating to the manufacture of NiMH cells results from storage of such cells for long periods of time after formation. When NiMH cells are stored for periods of up to nine months, they exhibit significant losses in capacity on the order of 10.5 percent of their initial capacity following formation. This loss in cell capacity is irreversible. Also, if cells are stored even for relatively short periods of time at relatively high temperatures, the cells similarly exhibit irreversible losses in capacity. Because long-term storage and storage at high temperatures following formation are difficult to avoid due to handling by third-party retail sales outlets and consumers, there exists a need for improved NiMH cells that do not exhibit such significant irreversible capacity loss under these somewhat common conditions.

Yet another problem occurs when NiMH cells are deeply discharged below recommended levels, as is the case when a consumer fails to turn off a device powered by a battery pack containing the NiMH cells. Following such deep discharges, the cells experience a significant and irreversible loss in capacity. Such losses may be approximately 10 percent of the cell capacity.

SUMMARY OF THE INVENTION

Accordingly, it is an aspect of the present invention to provide a formation procedure for a NiMH cell that converts a higher percentage of the Co(II) to Co(III) to thereby minimize the detrimental effects of the formation of $Co_3O_4$. An additional aspect of the present invention is to provide a formation procedure that also enables a high percentage of the $Ni(OH)_2$ to be activated to form NiOOH. Yet another aspect of the present invention is to provide a formation procedure that not only converts a higher percentage of the Co(II) to Co(III), but also is performed in a fraction of the time previously required for the formation of a NiMH cell.

To achieve these and other aspects and advantages, the method of forming a NiMH electrochemical cell according to the present invention comprises the steps of: (a) providing an assembled electrochemical cell having a positive electrode including a mix of a cobalt(II) compound and $Ni(OH)_2$, and (b) charging the cell at a constant voltage.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
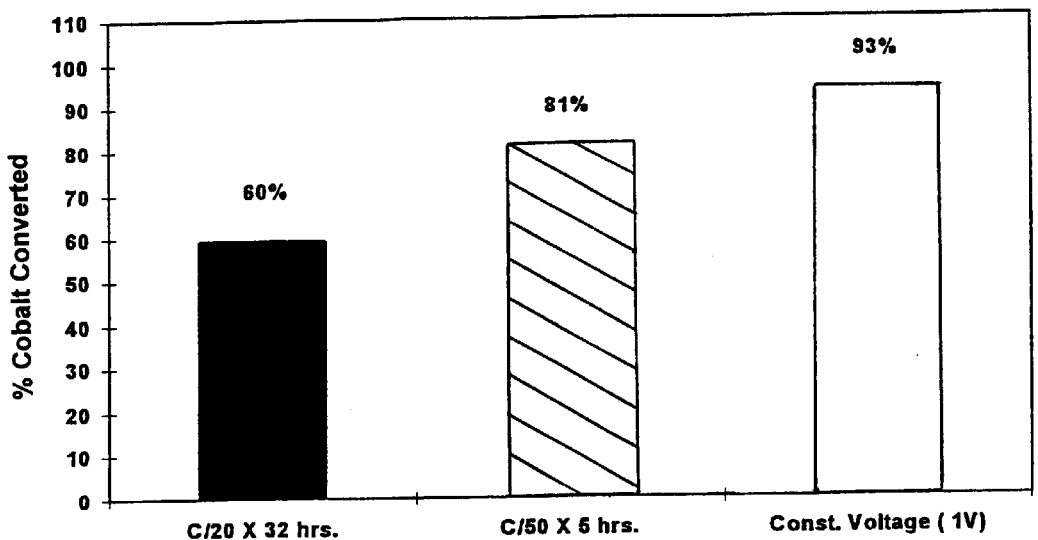
FIG. 1 is a bar graph showing the percent of Co(II) converted to Co(III) during formation using two conventional formation procedures and the formation procedure according to the present invention.

As noted above, the present invention relates to an improved formation procedure for a NiMH electrochemical cell. Such NiMH cells are rechargeable cells that include a metal hydride negative electrode and a positive electrode that includes a nickel compound that is capable of undergoing redox reactions, such as $Ni(OH)_2$. In accordance with the present invention, the positive electrode preferably includes a conductive foam carrier having a paste including the electrochemically active components, a binder, and a conductor, coated on and within the pores of the foam electrode carrier. The NiMH electrochemical cell may be assembled by any conventional technique, such as spirally winding the positive and negative electrodes and separator layers and depositing the spiral wound electrode assembly (also known as a "jelly roll") into a cylindrical cell housing. An alkaline electrolyte, which is preferably KOH, is also dispensed within the cell housing prior to closure and sealing of the cell housing.

The paste used to coat the positive electrode includes a mix of $Ni(OH)_2$ and CoO. The $Ni(OH)_2$ may be doped with Co, Zn, Al, Mn, etc. The paste mix also preferably includes a conductor, a binder, and water. The paste mix may be applied to the foam electrode carrier using any conventional roll coating process. The foam electrode carrier may be made of any compatible highly conductive material and is preferably made of nickel. The foam electrode preferably has between 80 and 110 pores per square inch.

Once the electrochemical cell has been assembled, the cells are stored for a period of approximately one week at temperatures not exceeding room temperature. During this preformation storage period, the CoO in the positive electrode mix dissolves in the alkaline electrolyte to form $HCoO_2^-$ ions. If the cells are stored less than three days at room temperature, the CoO in the positive electrode mix will not sufficiently dissolve in the electrolyte. On the other hand, if stored for more than one week, the $HCoO_2^-$ ions tend to migrate to the separator and the negative electrode and also tend to readily convert to the undesirable $Co_3O_4$ in the presence of highly alkaline electrolyte, which acts as an oxidizing agent. By maintaining the storage temperature of the preformed cells at or below room temperature and maintaining preformation storage between three days and one week, the conversion of the $HCoO_2^-$ ions to $Co_3O_4$ can be effectively reduced.

After the preformation storage period, the electrochemical cells are subjected to the inventive formation procedure, whereby the cells are first charged at a constant voltage. Subsequently, the cells are charged at a first constant current level or at a second constant voltage. Optionally, the cells may then be subjected to charging at a second constant current level that is lower than the first constant current level. The first of these three charging steps is used to convert the CoO to CoOOH. The second and third steps are used to convert the $Ni(OH)_2$ to NiOOH.

According to a first embodiment, the first charging step is performed by setting the charging voltage to approximately 1 volt for three to five hours while allowing the current to vary between C/20 to 0 mA. The second step involves the charging of the cell at a constant current of C/3 for approximately four hours. The third step involves charging at a constant current level of C/10 for approximately two hours. By lowering the charging current in the third step, the $Ni(OH)_2$, which may be buried deep in the electrode, is more likely to become activated than if the cell were continued to be charged at the C/3 constant current level utilized in the second charging step. Additionally, less oxygen is produced during the formation procedure when a lower current level is used in a final charging step.

The inventive formation procedure thus takes a total of nine to ten hours to complete, which is a marked improvement over the thirty-two hour duration of some of the prior formation procedures. As will be described further below, the inventive formation procedure not only reduces the formation procedure time by more than 68 percent, the inventive formation procedure converts a significantly higher percentage of the Co(II) in the cell to Co(III). This increase in percentage cobalt conversion leads to better performance in terms of utilization, long-term storage, and deep discharge recovery.

To determine the advantages of the present invention, identical groups of NiMH cells were assembled and subjected to one of three different formation procedures. The first formation procedure (Procedure I) included the single charging step of charging at a constant current of C/20 for thirty-two hours. The second formation procedure (Procedure II) included three charging steps all at constant current levels including a first step of charging at C/50 for five hours, a second step of charging at C/3 for five hours, and a final step of charging at C/10 for two hours. The third formation procedure (Procedure III) is that of the present invention whereby the cell was subjected to three charging steps with the first step being a constant voltage charge of 1.0 volt for three hours with the current allowed to vary between C/20 and 0 mA. The second charging step of the third formation procedure was to charge the cell at a constant current of C/3 for five hours. The third and last charging step was to charge at a constant current of C/10 for two hours.

FIG. 1 shows the percent of Co(II) in the positive electrode that is converted to Co(III) during the formation procedures (Procedures I, II, and III). For this determination, three groups of three 4/3 A size cells with a capacity of 3.0 AH were formed using the three formation procedures. The illustrated percentages were computed by determining the amount of CoO added to the positive electrode mix (in grams) and multiplying that amount by 358 mAH/g, which is the electrochemical capacity of CoO. This number is the theoretical amount of Co(II) that could be converted to Co(III) in the positive electrode. Knowing that cobalt is converted from (II) to (III) during a charge at a constant current rate when the voltage has reached 1.1 volts, the length of time it took to reach a cell voltage of 1.1 volts was measured and multiplied by the charging current to yield the amount of Co(II) that was electrochemically converted to Co(III) for those cells formed according to the constant current formation procedures (Procedures I and II).

For the cells formed according to the inventive formation procedure (Procedure III), the amount of Co(II) that was converted to Co(III) was determined by measuring and plotting the charging current versus time from commencement of the formation procedure until the charging current fell to 0.1 mA and then calculating the integral of the area under the plotted curve. To calculate the percentage of cobalt converted for all three procedures, the actual amount of cobalt converted was divided by the theoretical value and multiplied by 100.

As apparent from FIG. 1, the inventive formation procedure (Procedure III) results in a significant improvement in the percentage of Co(II) converted to Co(III). By converting a higher percentage of the cobalt during the formation procedure, less Co(II) is available to migrate through the separator and cause soft shorts and to form $Co_3O_4$, which is electrochemically inert and acts as an insulator. The effects of converting more of the Co(II) to Co(III) are described below with reference to FIGS. 4–6.

Figure 2:
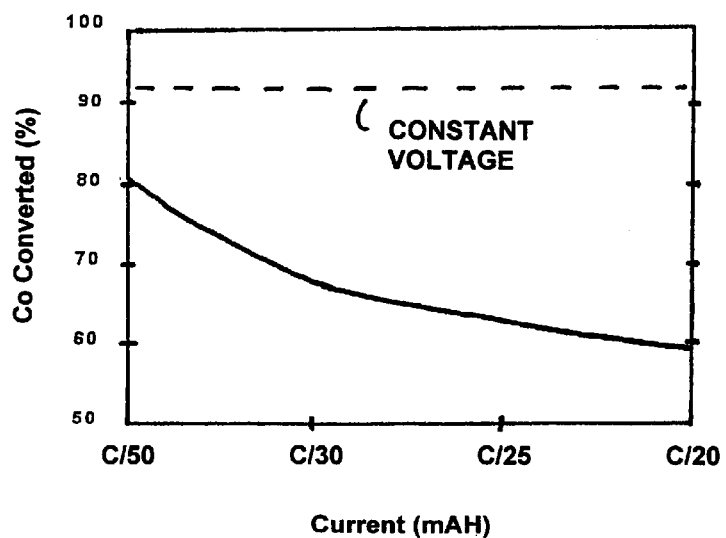
FIG. 2 is a line graph illustrating the percent of Co(II) converted to Co(III) as a function of charging current.

FIG. 2 shows the relation of the percentage of cobalt converted versus the charge current rate used for a constant current formation procedure (e.g., Procedures I and II). While the percentage of cobalt converted generally increases with decreasing charge rates, the percentage of cobalt converted eventually levels off and does not approach the percentages of cobalt converted when utilizing the formation procedure of the present invention (Procedure III). Furthermore, the lower the charging rate the longer it may take for the formation procedure.

Figure 3:
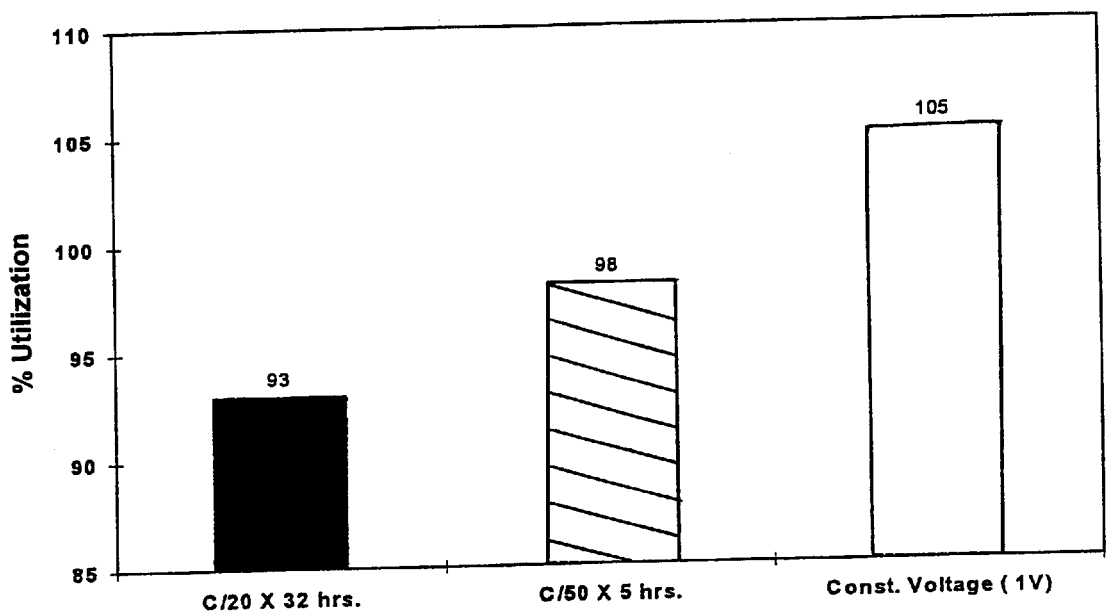
FIG. 3 is a bar graph comparing the percent utilization of cells subjected to one of two conventional formation procedures or the formation procedure according to the present invention.

FIG. 3 shows the effect of formation procedures on utilization. "Utilization" is the efficiency with which the active material of the cell is used or utilized during charge and discharge. To perform this test, three groups of three 4/3 A sized cells having a capacity of 3 AH were constructed and formed using the three formation procedures. The percentages shown in FIG. 3 were calculated by dividing the actual capacity obtained during C rate discharge by the theoretical capacity of the cell and multiplying that value by 100. The theoretical capacity of the cell was calculated by multiplying the amount of $Ni(OH)_2$ (in grams) in the positive electrode by 289 mAH/g, which is the electrochemical capacity of $Ni(OH)_2$. The actual capacity obtained during C rate discharge was measured following the first charge after the formation procedure at a C rate to 38° C. followed by a C/10 trickle for a total charge time of three hours. The C rate discharge was terminated when the cell voltage fell to 0.9 volt. The improvement in utilization is attributable to the improved conductive network surrounding the $Ni(OH)_2$/NiOOH particles, which, in turn, is attributable to the increased amount of CoO (Co(II)) that is converted to CoOOH (Co(III)) during the inventive formation procedure.

Figure 4:
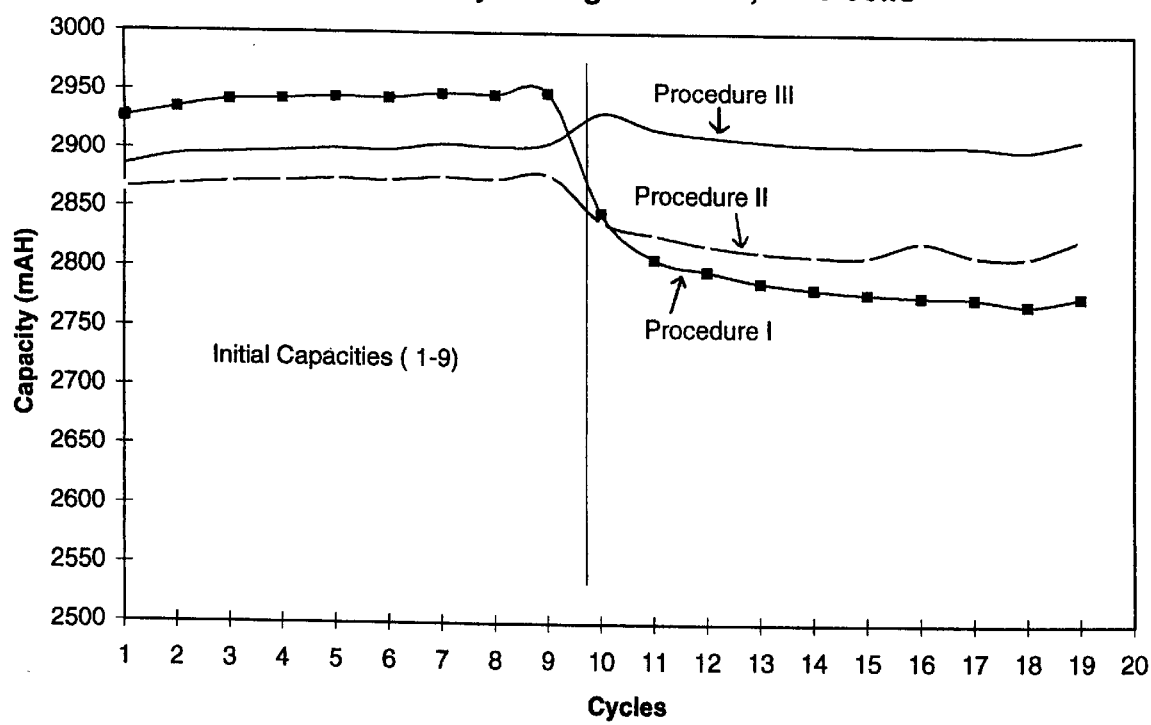
FIG. 4 is a line graph comparing the capacity of cells subjected to one of two conventional formation procedures or the formation procedure according to the present invention after the cells have been stored at high temperatures.

FIG. 4 illustrates the effect of the inventive formation procedure on the capacity of cells following storage at high temperatures. Three groups of eight 4/3 A sized cells were constructed and formed using the three formation procedures described above. Cells formed using the above three formation procedures were cycled nine times and then subsequently stored for 90 days at 40° C. and then cycled while measuring their capacities. The results were plotted in the graph shown in FIG. 4. Cells subjected to the inventive formation procedure (Procedure III) exhibited a marked improvement following storage at high temperatures. As compared to the capacities of the cells prior to storage at high temperatures, cells formed according to Procedure I exhibited a 6 percent drop in capacity from their initial capacity, while cells formed according to Procedure II exhibited a 1.8 percent drop in capacity. Cells formed according to the inventive formation procedure, however, experienced no loss in capacity. Thus, the inventive formation procedure offers the advantage of significantly decreased irreversible capacity loss for cells stored at high temperatures.

Figure 5:
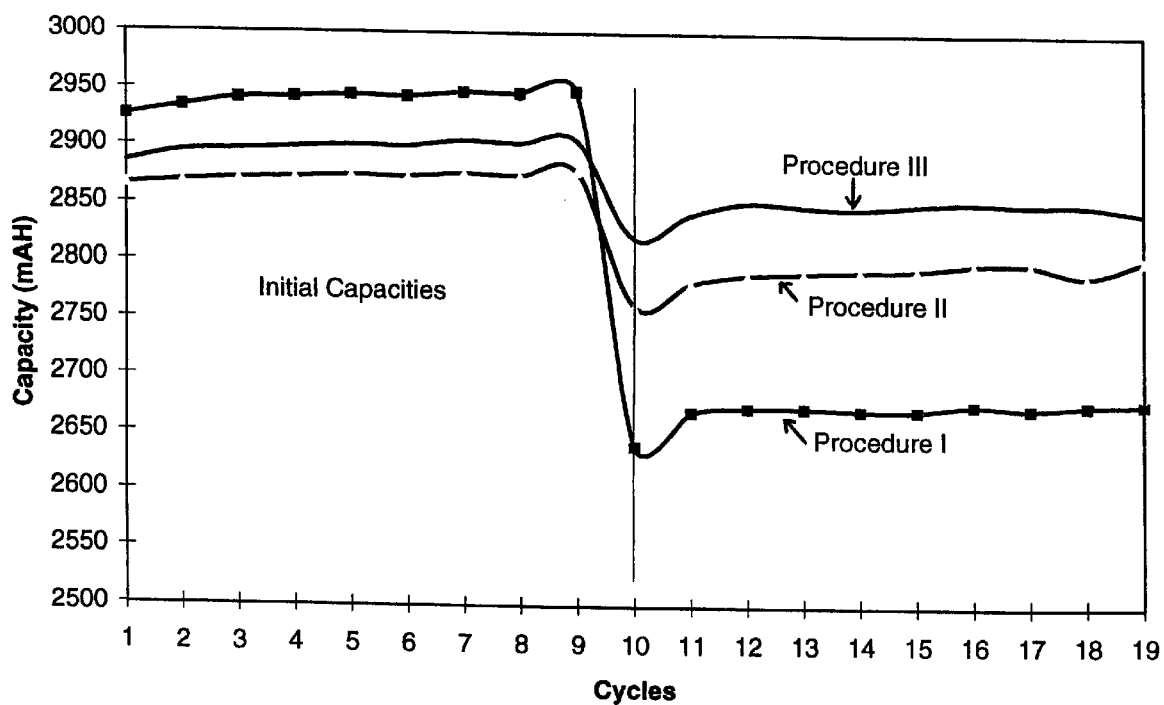
FIG. 5 is a line graph comparing the capacity of cells subjected to one of two conventional formation procedures or the formation procedure according to the present invention after the cells have been stored for an extended period of time.

FIG. 5 illustrates the effect of storage time at 25° C. on cell performance for cells formed using one of the three formation procedures described above. Three groups of eight 4/3 A sized cells were constructed and formed using the three formation procedures described above. After formation, the cells were stored for nine months at 25° C. and then cycled to measure their capacities. As apparent from FIG. 5, cells formed using the inventive formation procedure have higher capacities than cells formed using the two conventional formation procedures after long-term storage. In terms of irreversible loss of capacity, cells formed using Procedure I experienced a 10.5 percent loss in capacity from their initial capacity, cells formed using Procedure II experienced a 2.6 percent loss, while cells formed using the inventive Procedure III only experienced a 2 percent loss in capacity. Thus, the inventive formation procedure offers improved performance for cells that are likely to be stored in inventory or on retail shelves for prolonged periods of time.

Figure 6:
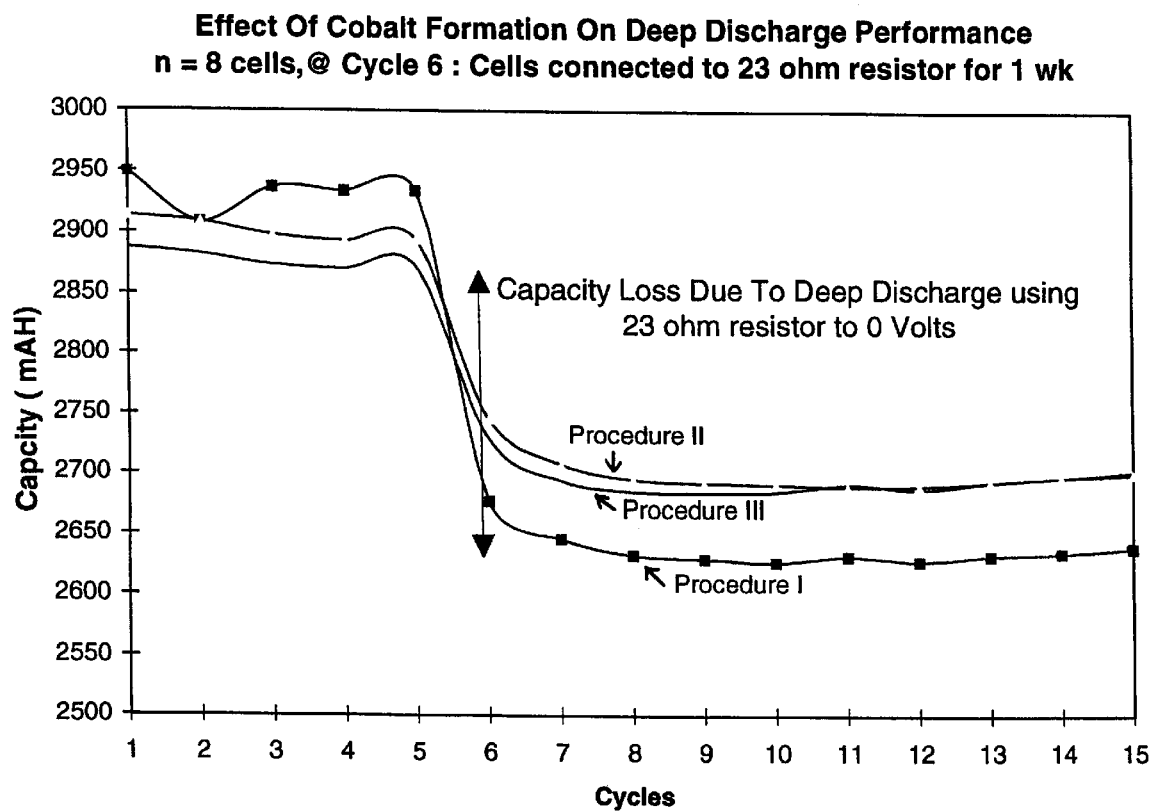
FIG. 6 is a line graph comparing the capacity of cells subjected to one of two conventional formation procedures or the formation procedure according to the present invention after the cells have been subjected to a deep discharge.

FIG. 6 shows the effect of formation procedures on the performance of cells subjected to a deep discharge. Three groups of eight 4/3 A sized cells were constructed and formed using the three formation procedures described above. Following formation, the tested cells were initially cycled five times and then connected to a 23-ohm resistor for one week to completely discharge the cells. This test was performed to replicate the over-discharge of cells as, at times, inadvertently performed by consumers. The tested cells were subsequently charged and discharged using the same conditions as used for initial cycling. FIG. 6 shows the capacity recovery after a deep discharge test. The capacities obtained from the various formation procedures were very similar before the deep discharge. After the deep discharge test, the average capacity of the cells formed using Procedure I dropped by 10.8 percent. The capacities of the cells formed using Procedure II dropped 6.8 percent, while the capacities of the cells formed using inventive Procedure III dropped 6.2 percent.

Figure 7:
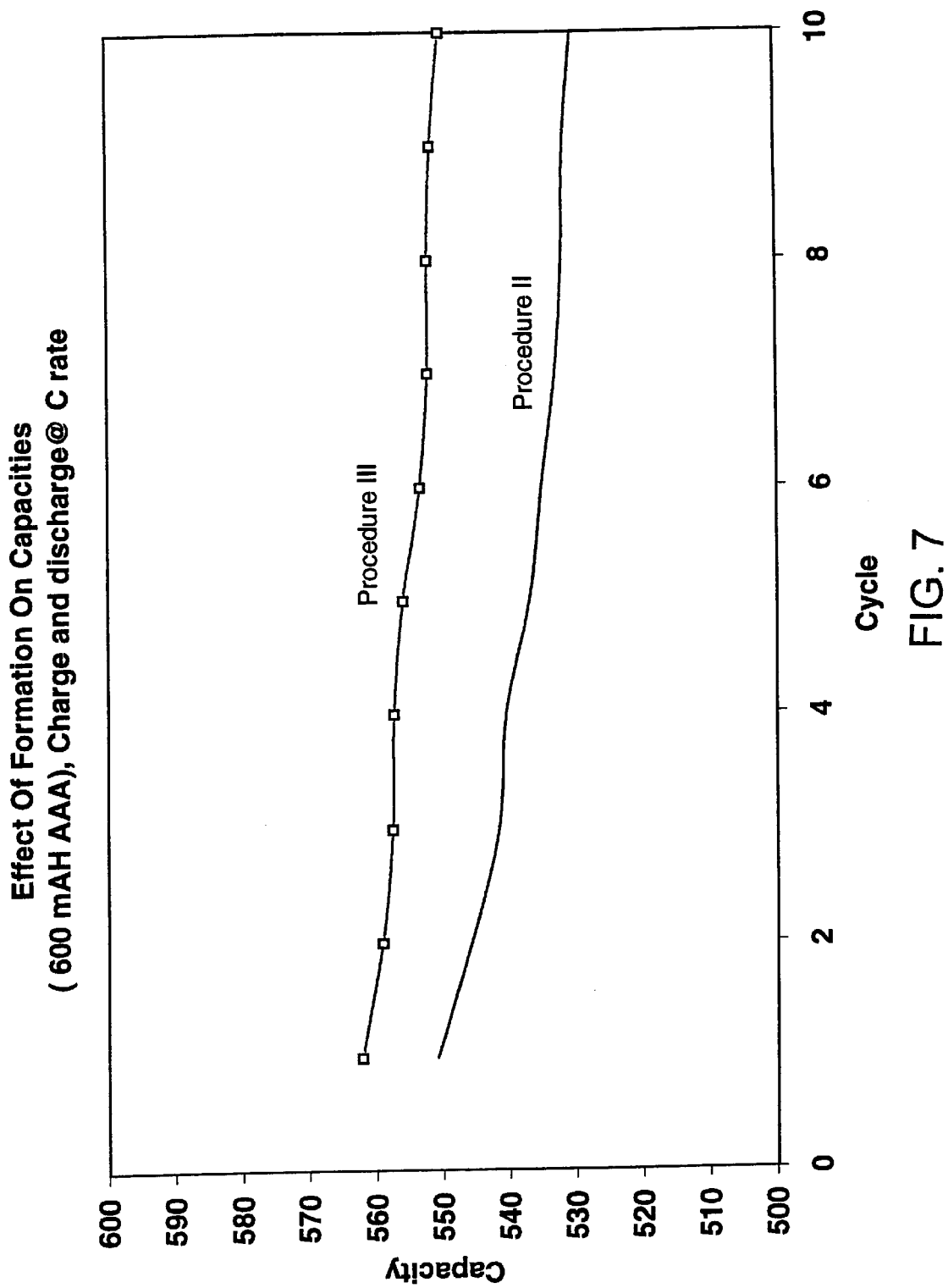
FIG. 7 is a line graph comparing the capacity of AAA cells subjected to one conventional formation procedure or the formation procedure according to the present invention.

To illustrate the effectiveness of the formation procedure of the present invention for an AAA size cell, two groups of three identical AAA size, 600 mAH cells were constructed. One group of cells was formed using formation Procedure II and the other was formed using Procedure III. The cells were then cycled and their capacities measured, averaged and plotted in the graph shown in FIG. 7. As shown in the graph, AAA cells formed using the inventive formation procedure exhibited higher capacities.

Like the formation procedure according to the first embodiment, the formation procedure of the second embodiment, includes a first charging step of charging the cell at a constant voltage of 1 volt. Thus, the same amounts of Co(II) are converted to Co(III) for both embodiments.

The second charging step differs, however, in that it involves charging at a constant voltage rather than a constant current to convert the Ni(OH)$_2$ to NiOOH. The constant voltage at which the cell is charged in the second step is preferably 1.45 to 1.5 volts. The second charging step is preferably carried out for a predetermined period of time of, for example, between about five and nine hours.

Figure 8:
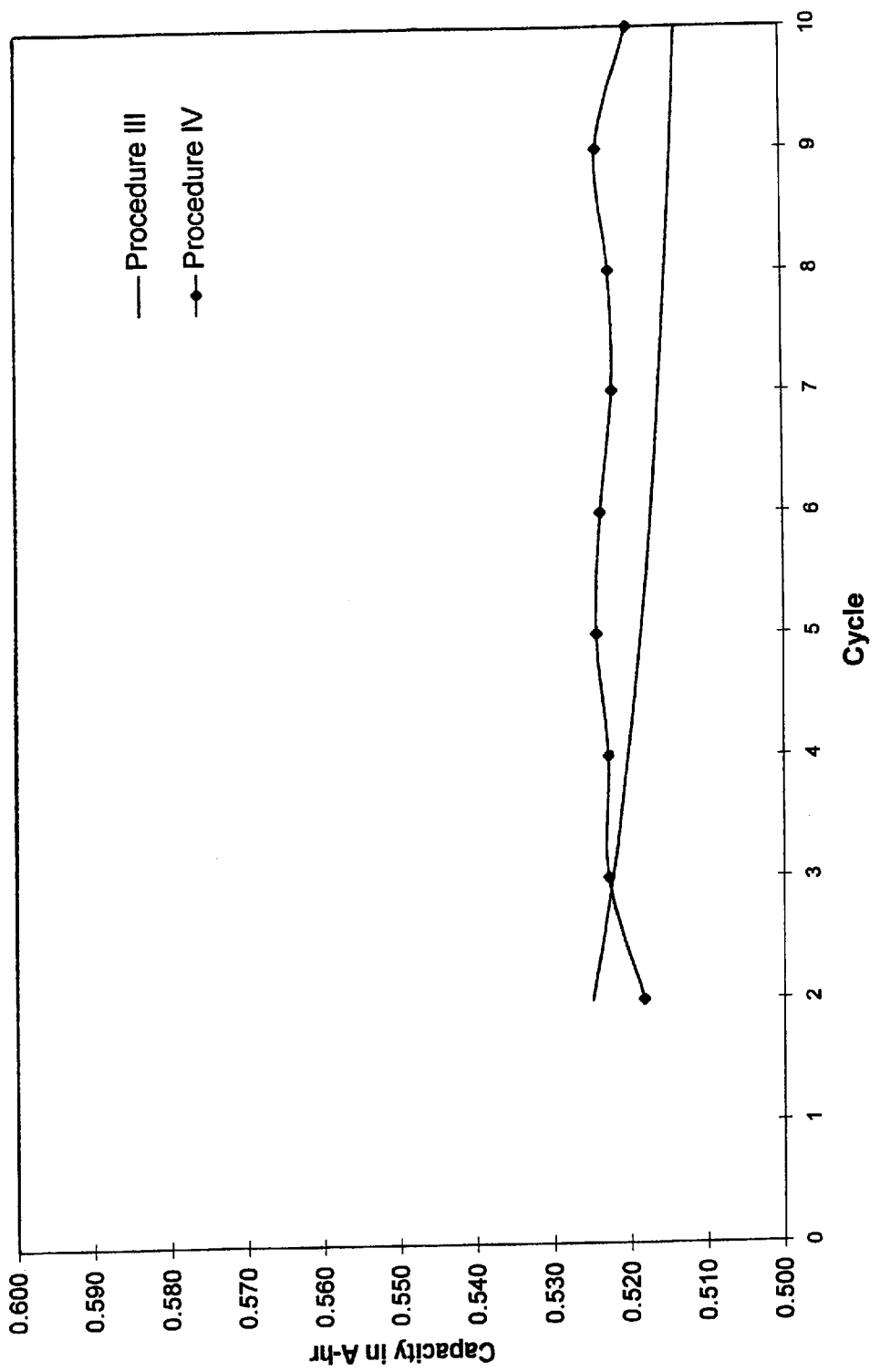
FIG. 8 is a line graph comparing the capacity of cells subjected to one of the formation procedure according to the present invention.

To determine the advantages of the inventive formation procedure according to the second embodiment, two groups of eight identical AAA size, 550 mAH cells were constructed. One group of cells was formed using Procedure III above, while the other group of cells was formed using the following formation procedure, hereinafter referred to as "Procedure IV," which is the formation procedure according to the second embodiment of the present invention. First, the cells were charged at a constant voltage of 1.0 volt for three hours, and then were charged at a constant voltage of 1.5 volts for seven hours. The cells were then cycled and their capacities were measured and plotted in the graph shown in FIG. 8. As shown in FIG. 8, the capacities of cells subjected to Procedure IV are higher than that of cells subjected to formation Procedure III.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A method of forming a cobalt-containing NiMH electrochemical cell comprising the steps of:
   (a) providing an assembled electrochemical cell having a positive electrode comprising a cobalt(II) compound and Ni(OH)$_2$; and
   (b) charging said cell at a constant voltage, wherein the constant voltage is about 1.0 volt and below 1.1 volt, wherein the current during charging varies from 0 to C/20 mA; and
   (c) charging said cell, after step (b), at a first constant current.

2. The method as defined in claim 1, wherein said charging step (c) is performed for a time period of about five hours.

3. The method as defined in claim 1, wherein said first constant current is about C/3.

4. The method as defined in claim 1, wherein said method further comprises step d of charging said cell at a second constant current after said cell has been charged in step (c).

5. The method as defined in claim 4, wherein said second constant current is lower than said first constant current.

6. The method as defined in claim 4, wherein said second constant current is about C/10.

7. The method as defined in claim 4, wherein said charging step (d) is performed for a time period of about two hours.

8. The method as defined in claim 4, wherein said total charging time is 9 to 11 hours.

9. The method as defined in claim 4, wherein, after step (d), at least 93 percent of the initial cobalt (II) present in step (a) is converted to cobalt (III).

10. The method as defined in claim 1, wherein said charging step (b) is performed for a time period of about three to five hours.

11. The method as defined in claim 1, wherein said positive electrode is a foam positive electrode.

12. The method as defined in claim 1, wherein said charging in step (c) is performed for a time period of about four to five hours.

13. The method as defined in claim 1, wherein said cell is charged in step (c) for a time period of about four hours.

14. The method as defined in claim 1, wherein said assembled electrochemical cell of step (a), prior to step (b), is stored after assembly of said cell at or below room temperature for a period of 3 to 7 days.

15. A method of forming a cobalt-containing NiMH electrochemical cell comprising the sequentially performed steps of:
   (a) providing an assembled electrochemical cell having a positive electrode comprising a cobalt(II) compound and Ni(OH)$_2$;
   (b) charging said cell at a constant voltage, wherein said constant voltage is about 1.0 volt and below 1.1 volt, wherein the current during charging varies from 0 to C/20 mA;
   (c) charging said cell at a first constant current; and
   (d) charging said cell at a second constant current, wherein said second constant current is different from said first constant current.

16. The method as defined in claim 15, wherein said second constant current is lower than said first constant current.

17. The method as defined in claim 15, wherein said second constant current is about C/10.

18. The method as defined in claim 15, wherein said charging step (d) is performed for a time period of about two hours.

19. The method as defined in claim 15, wherein said charging step (b) is performed for a time period of about three to five hours.

20. The method as defined in claim 15, wherein said charging step (c) is performed for a time period of about four to five hours.

21. The method as defined in claim 15, wherein said first constant current is about C/3.

22. The method as defined in claim 15, wherein said total charging time is 9 to 11 hours.

23. The method as defined in claim 15, wherein said assembled electrochemical cell of step (a), prior to step (b), is stored after assembly of said cell at or below room temperature for a period of 3 to 7 days.

24. The method as defined in claim 15, wherein, after step (d), at least 93 percent of the initial cobalt (II) present in step (a) is converted to cobalt (III).

25. A method of forming a cobalt-containing NiMH electrochemical cell, wherein said method comprises the steps of:

(a) providing an electrochemical cell comprising:
 a metal hydride negative electrode;
 a positive electrode comprising $Ni(OH)_2$ and a cobalt (II) compound; and
 an electrolyte for transporting ions between the positive and negative electrodes;
(b) charging said cell at a constant voltage, wherein the constant voltage is about 1.0 volt, and below 1.1 volt wherein the current during charging varies from 0 to C/20 mA; and
charging said cell at a first constant current;
and wherein at least 93 percent of the initial cobalt (II) present in said positive electrode of step (a) is converted to cobalt (III).

26. The method of claim 25, wherein, after step (c), there is a further step (d) of charging said cell at a second constant current.

27. The method of claim 25, wherein said positive electrode is a foam positive electrode.

* * * * *